(12) United States Patent
MacDougall et al.

(10) Patent No.: US 7,512,292 B2
(45) Date of Patent: Mar. 31, 2009

(54) MULTI-CORE STRAIN COMPENSATED OPTICAL FIBER TEMPERATURE SENSOR

(75) Inventors: Trevor MacDougall, Simsbury, CT (US); Edward Dowd, Madison, CT (US); Domino Taverner, Delray Beach, FL (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/531,145

(22) Filed: Sep. 12, 2006

(65) Prior Publication Data

US 2008/0063337 A1 Mar. 13, 2008

(51) Int. Cl.
  *G02B 6/00* (2006.01)
  *G02B 6/22* (2006.01)
  *G02B 6/34* (2006.01)
(52) U.S. Cl. .............................. 385/12; 385/24; 385/37; 385/126
(58) Field of Classification Search ........................ None
  See application file for complete search history.

(56) References Cited

U.S. PATENT DOCUMENTS

| | | | |
|---|---|---|---|
| 4,295,739 A | 10/1981 | Meltz et al. | |
| 5,563,967 A * | 10/1996 | Haake | ........................... 385/12 |
| 6,024,488 A | 2/2000 | Wu et al. | |
| 6,201,237 B1 | 3/2001 | Berkey et al. | |
| 6,278,818 B1 * | 8/2001 | Laming et al. | ................. 385/37 |
| 6,668,656 B2 | 12/2003 | Fernald et al. | |
| 6,807,324 B2 * | 10/2004 | Pruett | ........................... 385/12 |
| 6,813,013 B2 | 11/2004 | Fernald et al. | |
| 7,138,621 B2 * | 11/2006 | Wang | ..................... 250/227.14 |
| 2002/0146226 A1 * | 10/2002 | Davis et al. | .................. 385/126 |
| 2004/0234218 A1 * | 11/2004 | Tao et al. | ..................... 385/126 |
| 2006/0013523 A1 * | 1/2006 | Childers et al. | ................ 385/12 |
| 2007/0286561 A1 | 12/2007 | Poland et al. | |

FOREIGN PATENT DOCUMENTS

GB       2 341 445       3/2000

OTHER PUBLICATIONS

GB Search Report, Application No. GB0717402.2, dated Dec. 28, 2007.

* cited by examiner

*Primary Examiner*—Tina M Wong
(74) *Attorney, Agent, or Firm*—Patterson & Sheridan, L.L.P.

(57) ABSTRACT

Methods and apparatus for discrete point temperature sensing include a temperature sensor that can be part of an array of temperature sensors for location in a wellbore. A single unitary ribbon-like structure can form the temperature sensor that has separate optical cores possessing different characteristics such that one core is unique from another core. Each core has a reflective grating disposed therein such that the wavelength of light reflected by the gratings is in response to temperature and any strain applied to the sensor from a surrounding environment. For some embodiments, the responses to strain from each of the gratings are similar while the responses from each of the gratings to temperature are dissimilar due to the different characteristics of the cores. These responses provided separately by each grating therefore enable compensation for strain in order to provide an accurate temperature measurement at the sensor.

8 Claims, 3 Drawing Sheets

MULTI-CORE STRAIN COMPENSATED OPTICAL FIBER TEMPERATURE SENSOR

BACKGROUND OF THE INVENTION

1. Field of the Invention

Embodiments of the invention generally relate to optical based temperature sensors.

2. Description of the Related Art

Various approaches exist for intelligent wells that monitor temperatures within oil and gas wellbores. Some reasons for monitoring these temperatures include reducing operating costs and increasing yield from individual reservoirs. Cost effectively providing more accurate and reliable measurements over a period of time can therefore improve benefits provided by these intelligent wells.

Sensors for measuring the temperatures in the wellbore can include optical sensors, which avoid problems associated with electrically based systems. A plurality of the optical sensors can form an array of optical sensors disposed along an optical cable that includes an optical transmission waveguide such as an optical fiber. The array of sensors can include a plurality of optical Bragg gratings that each return a signal whose wavelength varies with applied temperature. These arrays can be interrogated by, for example, time division multiplexing or wavelength division multiplexing.

As another example of optical based temperature measurement that can be utilized in the wellbore, the optical waveguide itself can be employed as a distributed temperature sensor (DTS) to provide more than one measurement along its length. The DTS can be based on analysis (e.g., Raman scattering analysis) of reflected light that is altered in accordance with the temperature of the waveguide. Processing such reflections as a function of time derives temperature as a function of well depth with earlier reflections indicating the temperature at relatively shallow depths.

The signals from these sensors disposed at discrete points or from the DTS can undesirably be influenced by other parameters than temperature, thereby altering a response indicated by the signal. For example, strain or pressure applied to the sensor may dynamically change making calibration of the signal to account for the strain impossible since there is no way to tell which parameter is contributing to the response of the sensor. Accordingly, multiple parameters contributing to the response undermine accuracy and confidence in temperature measurements utilizing either DTS or Bragg grating based sensors.

Therefore, there exists a need for apparatus and methods that perform improved discrete point temperature sensing using optical waveguides.

SUMMARY OF THE INVENTION

Embodiments of the invention relate to a discrete point temperature sensor that can be part of an array of such sensors for location in a wellbore. A single unitary structure forms the temperature sensor that has separate optical cores possessing different characteristics such that one core is unique from another core. Each core has a reflective grating (e.g., a Bragg grating) disposed therein such that the wavelength of light reflected by the gratings is in response to temperature and any strain applied to the sensor from a surrounding environment. According to some embodiments, dimensions and structural configuration of the structure forming the temperature sensor can aid in ensuring that the cores at the gratings experience the same or substantially similar stress. For some embodiments, the responses to strain from each of the gratings are similar while the responses from each of the gratings to temperature are dissimilar due to the different characteristics of the cores. These responses provided separately by each grating therefore enable compensation for strain in order to provide an accurate temperature measurement at the sensor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention relate to a discrete point temperature sensor having separate optical cores with different characteristics disposed within a single unitary structure. Each core has a reflective grating (e.g., a Bragg grating) disposed therein such that the wavelength of light reflected by the gratings is in response to temperature and any strain applied to the sensor from a surrounding environment. Due to the different characteristics of the cores, the responses to strain from each of the gratings are similar while the responses from each of the gratings to temperature are dissimilar. These responses provided separately by each grating therefore enable compensation for strain in order to provide an accurate temperature measurement.

Figure 1:
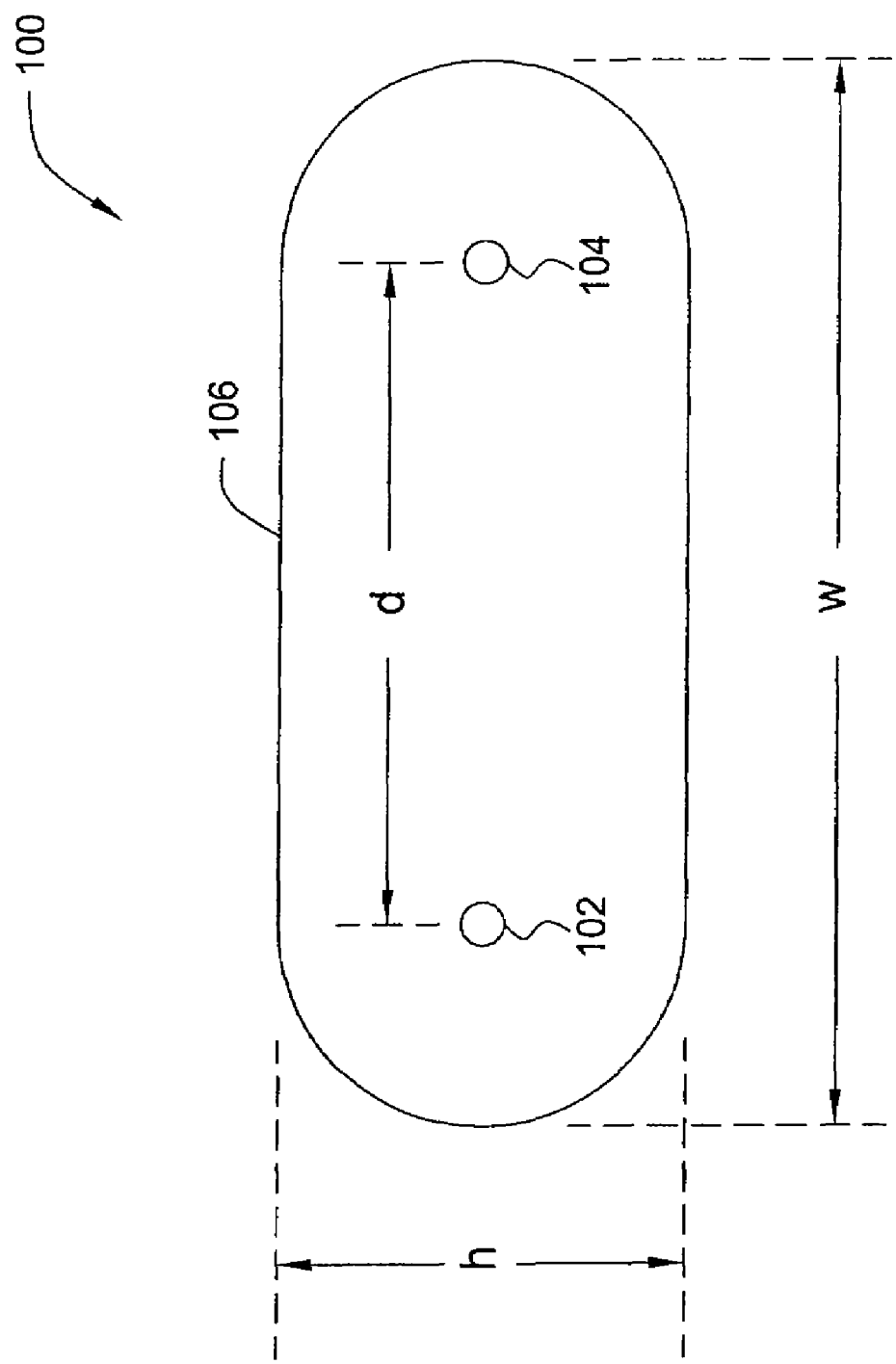
FIG. 1 is an end view of a dual core waveguide according to embodiments of the invention.

FIG. 1 shows an end view of a dual core waveguide 100 according to embodiments of the invention. The dual core waveguide 100 includes a first core 102 and a second core 104 provided together within a unitary structure that forms the dual core waveguide 100. The cores 102, 104 are each surrounded by cladding 106 with an appropriate refractive index relative to a refractive index of the cores 102, 104 such that light propagates through the cores 102, 104. Light introduced into each of the cores 102, 104 propagates separately through the cores 102, 104 along a length of the waveguide 100 since the cores 102, 104 run parallel to one another and are spaced from one another by a distance (d) to prevent interference between the cores 102, 104. Preferably, the cores 102, 104 once surrounded by the cladding 106 yield suitable single mode optical pathways.

Figure 2:
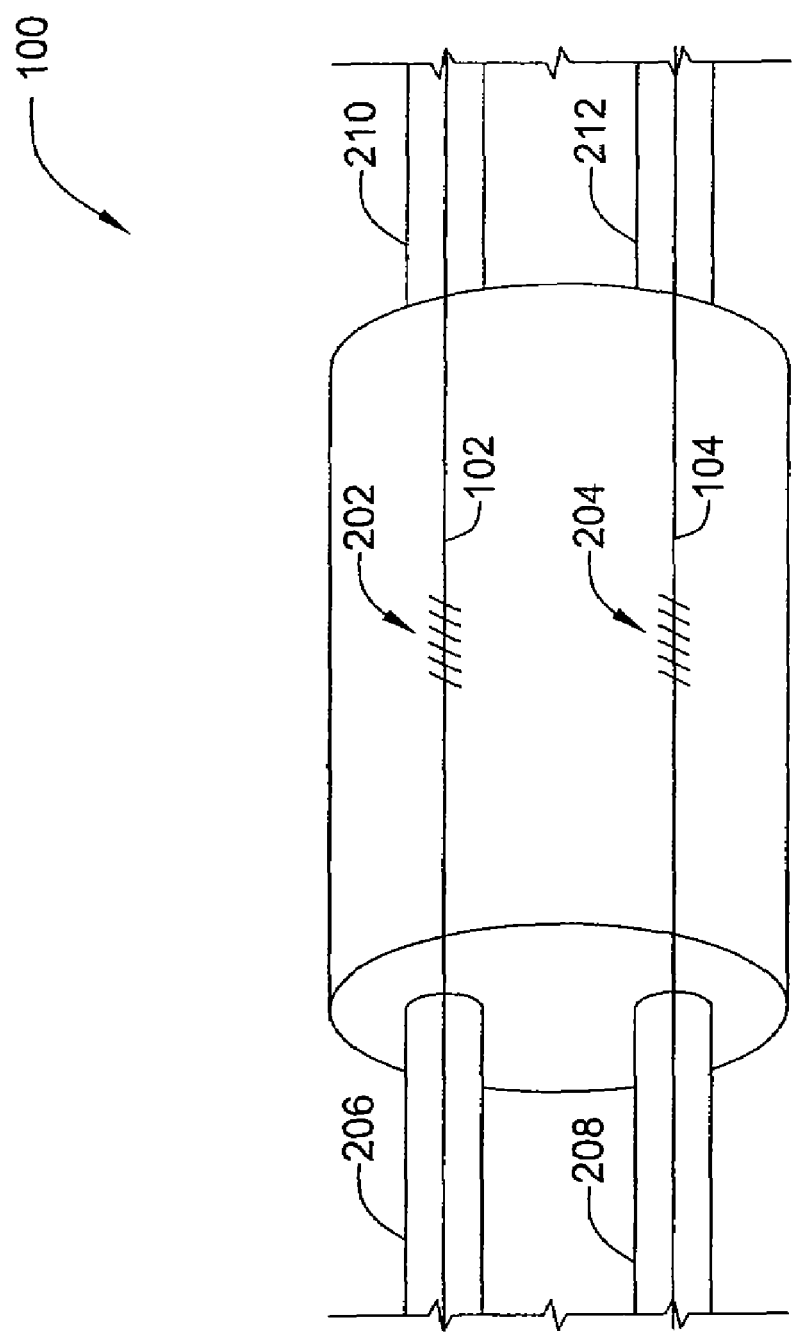
FIG. 2 is a schematic top view of the dual core waveguide shown optically coupled with optical fibers.

FIG. 2 illustrates a schematic top view of the dual core waveguide 100 shown optionally optically coupled with first and second input optical fibers 206, 208 and first and second output optical fibers 210, 212. The first core 102 includes a first Bragg grating 202 that is disposed adjacent to a second Bragg grating 204 imprinted in the second core 104. While the first and second Bragg gratings 202, 204 can be exactly the same, the gratings 202, 204 react differently to temperature and strain depending on which one of the cores 102, 104 that the grating is in due to differences in the cores.

The first core 102 differs from the second core 104 in at least one characteristic. As discussed herein in further detail, this difference in the cores 102, 104 provides similar responses to strain and dissimilar responses to temperature in each core as light is transmitted through each core and across the Bragg gratings 202, 204, which reflect light to provide the responses. The characteristic can be determined by one or more of a material composition, geometry or a fabrication technique of the cores 102, 104 and/or cladding 106. For example, the geometry of the first core 102 can provide a more elliptical cross sectional shape than the second core 104 that is relatively more rounded in shape. Modifying intrinsic strain fixed in the cores 102, 104 during a manufacturing process of the waveguide 100 can, for some embodiments, be utilized to provide different characteristics between the cores since the first core 102 can have a first strain frozen in that is different from a second strain frozen in the second core 104.

For some embodiments, doping of the first core 102 with different elements and/or compounds than what the second core 104 is doped with provides the cores with different characteristics as desired. A change in wavelength of light reflected by a Bragg grating due to a change in temperature can range from, for example, 10.2 picometer per degree Celsius to 12.9 picometer per degree Celsius depending on which of various differently doped cores that the grating is imprinted. The first core 102 can be heavy germanium (Ge) doped while the second core can be heavy boron (B) doped with heavy doping meaning greater than 10.0 mol % and up to about 30.0 mol % percent of a doping element. The first core 102 can therefore have a germanium concentration of about 25.0 mol % and no boron. Concentration of boron and germanium in the second core 104 can be about 25.0 mol % and about 10.0 mol %, respectively. With these doping concentrations for the first and second cores 102, 104, reflected light form both the Bragg gratings 202, 204 changes wavelength substantially the same amount relative to the common strain applied to both the gratings. However, the first Bragg grating 102 provides a change in wavelength of about 11.99 picometer per degree Celsius while the second Bragg grating provides a change in wavelength of about 10.79 picometer per degree Celsius.

Therefore, the wavelength change attributed to strain can be compensated for in order to provide an accurate temperature measurement by analyzing the signals received from each of the Bragg gratings 202, 204. In other words, any difference in the wavelength change of the response from the first Bragging grating 202 relative to the wavelength change of the response from the second Bragging grating 204 is directly attributed to temperature since only the temperature responses between the Bragg gratings 202, 204 differ. Accordingly, the wavelength responses can be analyzed to determine the temperature at the Bragg gratings 202, 204 that form a sensor even when the sensor is strained and the strain is dynamic. Even if the strain response is different between the Bragg gratings 202, 204, the temperature measurement can still be compensated for strain applied to the sensor by calibrating the sensor and calculating an accurate temperature measurement since there are two responses and only two unknowns (i.e., temperature and stress).

Referring to FIG. 1, a height (h) of the waveguide 100 is greater than a width (w) thereof. The cores 102, 104 are disposed in a spaced relationship next to one another along the width and within about the same planar area defined across the width so that the cores 102, 104 are at about the same position along the height of the waveguide 100. Thus, the waveguide 100, which is a glass structure, defines a ribbon-like element having a generally rectangular cross section with a preferred axis of bending parallel to its width and not its height. These dimensions and structural configuration aid in ensuring that the cores 102, 104 at the Bragg gratings 202, 204 experience the same or substantially similar stress from bending of the waveguide 100. By inhibiting bending along an axis parallel to the height of the waveguide 100 and favoring bending in a manner that does not require any more bending of one of the cores 102, 104 relative to the other, the cores 102, 104 tend to bend the same amount creating similar strain states in both the cores 102, 104.

For some embodiments, the height is approximately 80.0 microns while the width is approximately 200.0 microns. However, precise dimensions are less relevant than generally preserving a ratio of height to width (h/w) since this ratio should provide a preferred bending axis for the waveguide 100. The distance (d) between the cores 102, 104 as previously discussed prevents cross interference and is therefore typically greater than about 10.0 microns or greater than about 15.0 microns. Additionally, the distance separating the cores 102, 104 can depend on acceptable error of the measurements since larger distances make it more likely that one of the cores experiences a different sensing environment such as a different temperature. Any dimension of the distance between the cores 102, 104 less than 1.0 millimeter creates small to no difference in temperature between the core in most applications. The distance between the cores 102, 104 also enables attachment of the fibers 206-212 (shown in FIG. 2) due to there being working space between the cores.

The input optical fibers 206, 208 are fused to one end of the dual core waveguide 100 such that light traveling through the first input optical fiber 206 aligns with the first core 102 and light traveling through the second input optical fiber 208 aligns with the second core 104. Similarly, the output optical fibers 210, 212 are fused to the other end of the dual core waveguide 100 such that light exiting through the first core 102 aligns with the first output optical fiber 210 and light exiting through the second core 104 aligns with the second output optical fiber 212. For some embodiments, the response from the Bragg gratings 202, 204 are at different wavelengths such that it is possible to couple the input optical fibers 206, 208 along a single pathway or fiber. The optical fibers 206-212 can be part of a standard optical cable and can further be optional in situations where the waveguide 100 also provides interconnecting optical pathways. As further described next, the input optical fibers 206, 208 transmit light from a broadband light source to the gratings 202, 204 and return reflections forming the response from the gratings 202, 204 to detection and analysis equipment. Additionally, the output optical fibers 210, 212 can connect as inputs to subsequent sensors multiplexed with the waveguide 100.

Figure 3:
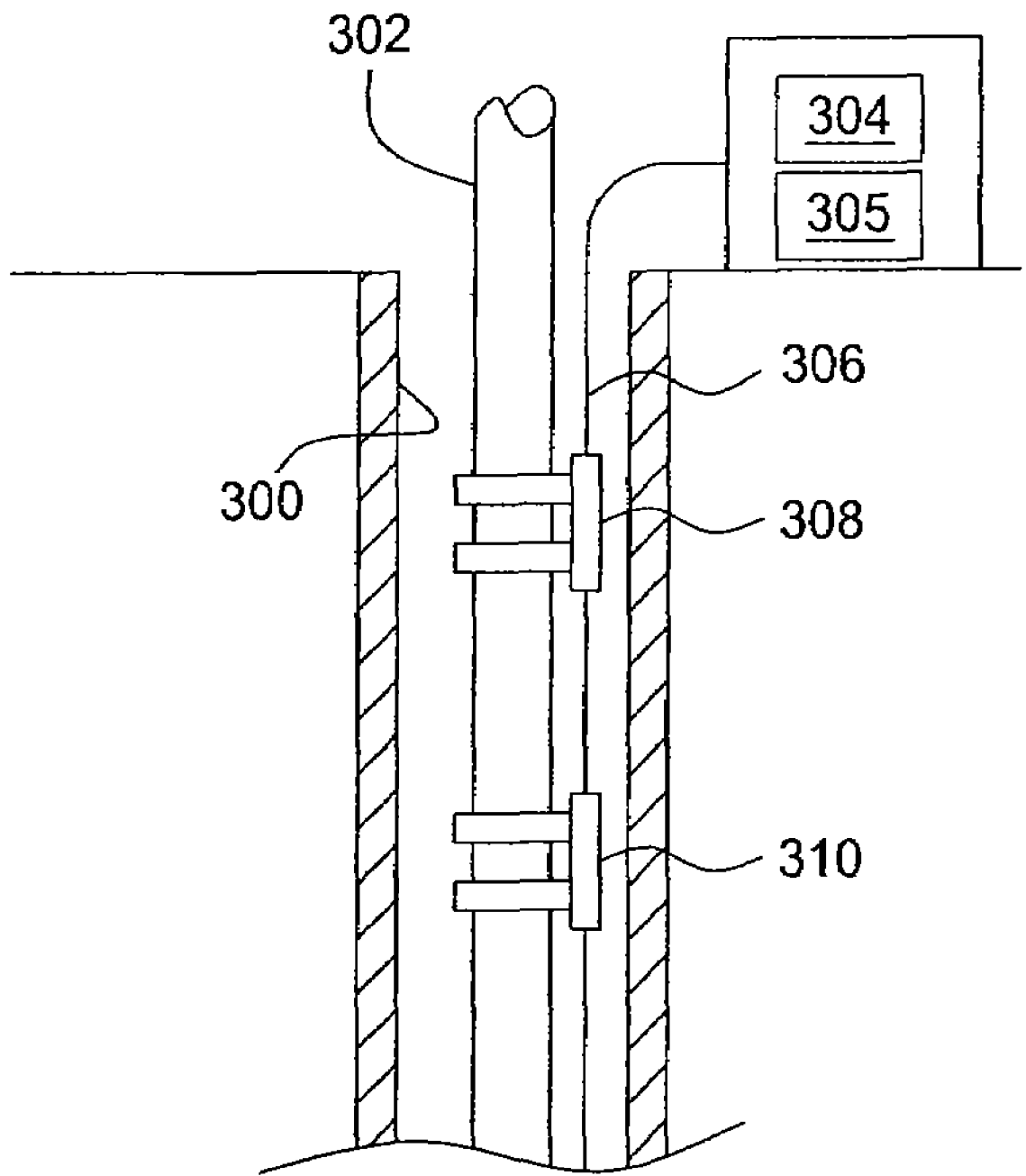
FIG. 3 is a partial section view of a wellbore utilizing the dual core waveguide to enable multiple discrete temperature measurements according to embodiments of the invention.

FIG. 3 shows a partial section view of a wellbore 300 having first and second temperature sensors 308, 310. Each of the sensors 308, 310 utilizes a dual core waveguide according to embodiments of the invention to enable multiple discrete temperature measurements at various points in the wellbore 300. As shown, clamps secure the sensors 308, 310 to a conveyance member such as production tubing 302 for lowering the sensors into the wellbore 300. The sensors are optically coupled via an optical cable 306 to a broadband light source 304 and signal detection and processing equipment 305.

In operation, light from the broadband light 304 is introduced into cable 306 and hence into the first temperature sensor 308 where at least two Bragg gratings disposed in different separate cores reflect portions of the light to respectively provide first and second signals. These signals are indicative of temperature at the first temperature sensor 308 and are received by the signal detection and processing equipment 305. Next, analyzing the signals with the signal detection and processing equipment 305 determines a temperature measurement that is compensated for strain at the sensor based on similar strain effects on both the first and second signals. Temperature at another discrete point in the wellbore 300 can be measured in a corresponding manner with the second temperature sensor 310 utilizing remaining light passed through the first temperature sensor 308.

Compensation for strain in temperature measurements according to embodiments of the invention utilizes different characteristics of two or more cores so that the responses to at least one of strain and temperature from one grating in one of the cores is dissimilar from corresponding responses to at least one of strain and temperature from another grating in another one of the cores. While only two cores 102, 104 have been shown within the waveguide 100, additional cores can be incorporated in the waveguide 100. One or more of these additional cores can have a Bragg grating therein and can have a different characteristic yet to further improve accuracy and resolution in the measurements described heretofore. Further, other reflective structures than a Bragg grating and/or other optical sensor arrangements can be implemented and benefit from the foregoing description of the embodiments described above.

While the foregoing is directed to embodiments of the present invention, other and further embodiments of the invention may be devised without departing from the basic scope thereof, and the scope thereof is determined by the claims that follow.

What is claimed is:

1. A system for sensing temperature in a wellbore, comprising:
   a temperature sensor disposed in the wellbore, wherein the temperature sensor comprises first and second Bragg gratings disposed respectively in first and second cores within a unitary structure and has a characteristic such that the Bragg gratings provide different responses to temperature; and
   signal processing equipment configured to analyze the signals to determine a temperature measurement, wherein the temperature measurement is compensated for strain at the sensor based on similar strain effects on both the first and second signals.

2. The system of claim 1, wherein the signal processing equipment is optically coupled to the unitary structure by first and second fibers having ends aligned respectively with the first and second cores.

3. The system of claim 1, wherein the temperature sensor is part of an array formed by additional sensors similar to the temperature sensor spaced along the array.

4. The system of claim 1, wherein the temperature sensor is part of an array formed by additional sensors similar to the temperature sensor spaced along the array and connected to one another by optical fibers.

5. The system of claim 1, wherein the unitary structure has a width greater than a height with the cores separated from one another along the width but not substantially in a direction of the height.

6. The system of claim 1, wherein the first core has a different material composition than the second core.

7. The system of claim 1, wherein the first core has a different geometry from the second core.

8. The system of claim 1, wherein the first core has a different intrinsic strain than the second core.

* * * * *